United States Patent

[11] 3,628,641

[72] Inventor John N. Snodgrass
Miamisburg, Ohio
[21] Appl. No. 32,265
[22] Filed Apr. 27, 1970
[45] Patented Dec. 21, 1971
[73] Assignee General Motors Corporation
Detroit, Mich.

[54] VISCOUS FLUID CLUTCH
10 Claims, 9 Drawing Figs.

[52] U.S. Cl. .................................................. 192/58 B,
192/82 T
[51] Int. Cl. .......................................................... F16d 35/00
[50] Field of Search ........................................... 192/58 A,
58 B, 58 C, 82 T

[56] References Cited
UNITED STATES PATENTS
3,144,922  8/1964  Weir .............................. 192/58 B
3,259,221  7/1966  Godfrey ........................ 192/58 B
2,902,127  9/1959  Hardy ........................... 192/58 B Primary Examiner—Allan D. Herrmann
Attorneys—Warren E. Finken, A. M. Heiter and John P. Moran ABSTRACT: A viscous fluid clutch including relatively rotatable first and second drive members having a fluid shear space therebetween and which are cooperable with a fluid medium in the shear space to provide a shear-type fluid drive therebetween, an annular reservoir for at times storing the fluid medium, a temperature-responsive valve for controlling the flow of the fluid medium from the annular reservoir through an inlet port to the fluid shear space, continually open outlet ports and cooperating pump elements or wipers for forcing the fluid medium from the fluid shear space to the reservoir, and an annular cushion member mounted on one of the drive members, radially outwardly of the oppositely disposed ridge and groove shear space elements, between either radially extending or parallel tapered thrust faces of the clutch and housing members for improving the bearing characteristics and/or cushioning the impact therebetween under "wobble" conditions.

PATENTED DEC 21 1971

3,628,641

INVENTOR.
John N. Snodgrass
BY
John P. Moran
ATTORNEY

VISCOUS FLUID CLUTCH

This invention relates generally to variable speed drive devices, and more particularly, to a viscous fluid drive adapted to drive an accessory device, such as a cooling fan, for an internal combustion engine.

Vehicle cooling fans are generally belt driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

An object of the invention is to provide improved means for improving the bearing characteristics between the clutch and housing members under "wobble" conditions.

Another object of the invention is to provide improved means intermediate the thrust faces of the clutch and housing members, either freely mounted therebetween or secured for rotation with one of the members, for decreasing wear on the members.

A specific object of the invention is to provide a viscous shear fan drive having a housing including a rear wall, a front wall, a divider wall therebetween, an operating or working chamber formed between the rear and divider walls for receiving a clutch plate in viscous shear drive relation with the housing, an annular reservoir formed between the divider and front walls, continuously open outlet ports formed in the divider wall and cooperating pump or dam means for forcing the fluid from the reservoir and through the outlets into the operating chamber, a temperature-controlled inlet port formed in the divider wall between the operating chamber and the reservoir, and a washer member mounted between and secured to one of opposing parallel thrust faces of the rear wall and the clutch plate radially outwardly of the ridge and groove elements which produce the viscous shear drive relationship.

A more specific object of the invention is to provide such a viscous shear fan drive, wherein the opposing parallel thrust faces of the rear wall and the clutch plate are tapered, causing the intermediate washer member to flex under "wobble" conditions, thereby cushioning the impact therebetween and, consequently reducing the load on the water pump.

These and other objects and advantages will become apparent when reference is made to the following description and the accompanying drawings, wherein.

Figure 4:
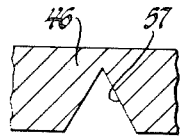
Figure 5:
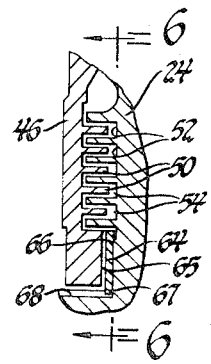
Figure 3:
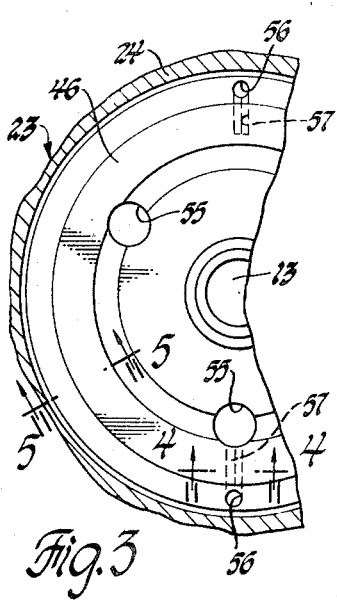
FIG. 3 is a cross-sectional view taken on the plane of line 3—3 of FIG. 2, as if FIG. 2 were a complete and full round view, and looking in the direction of the arrows.
Figure 6:
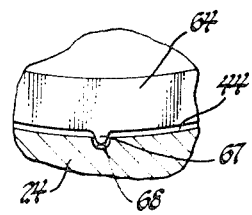
Figure 7:
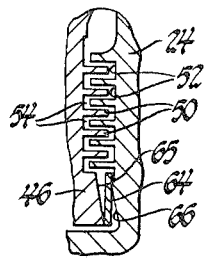
Figure 8:
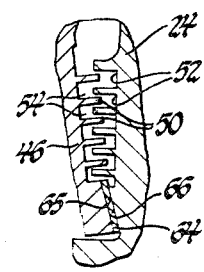
Figure 9:
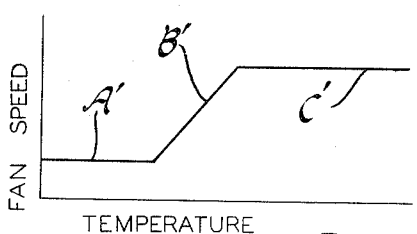

FIGS. 4 and 5 are fragmentary cross-sectional views taken on the planes of lines 4—4 and 5—5, respectively, of FIG. 3, and looking in the directions of the arrows;

FIG. 6 is a fragmentary cross-sectional view taken on the plane of line 6—6 of FIG. 5, and looking in the direction of the arrows;

FIGS. 7 and 8 illustrate an alternate embodiment of a portion of the FIG. 5 structure; and FIG. 9 is a graph illustrating a characteristic of the invention.

Figure 1:
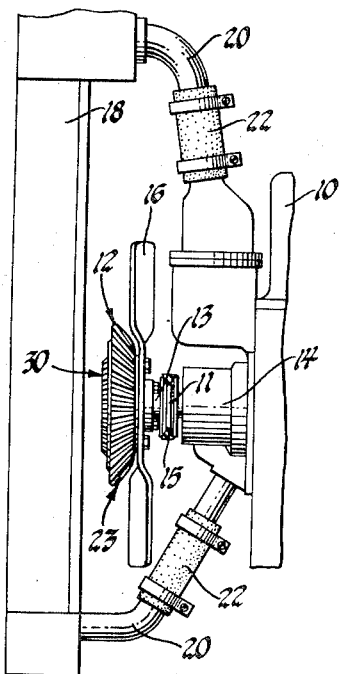
FIG. 1 is a fragmentary side elevational view of a radiator and engine having a viscous fluid clutch-driven cooling fan associated therewith.

Referring to the drawings in greater detail, FIG. 1 illustrates an engine 10 having a viscous fluid clutch 12 and a pulley 11 mounted on a drive shaft 13 extending from the conventional water pump 14, the pulley 11 being rotated by a V-belt 15 connected to the crankshaft (not shown) for driving a cooling fan 16 secured to the clutch 12. The fluid clutch 12 and the cooling fan 16 are located between the engine 10 and a radiator 18. The usual conduits 20 and associated hoses 22 communicate between radiator 18 and the engine 10 adjacent the water pump 14.

Figure 2:
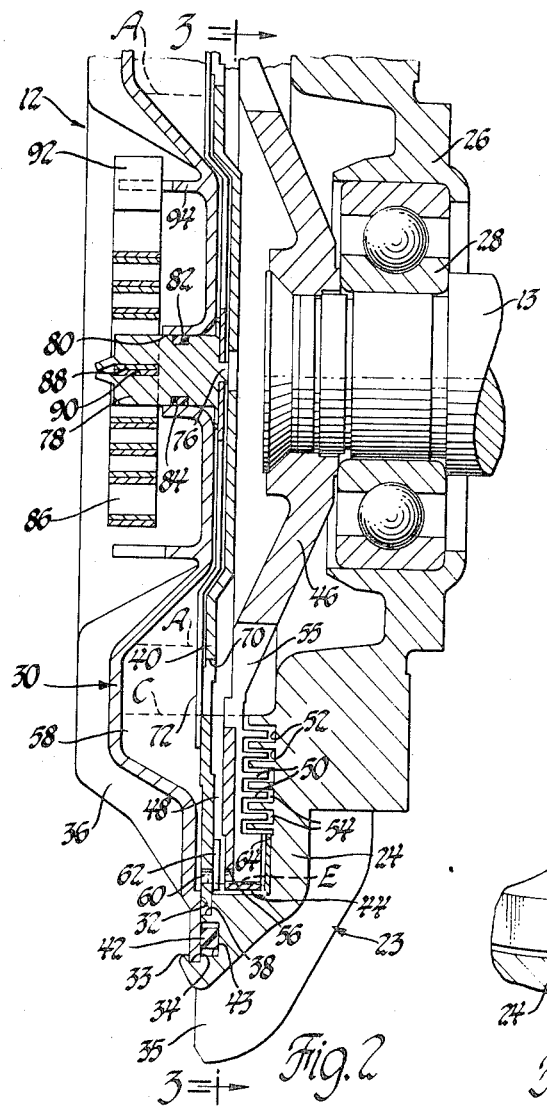
FIG. 2 is an enlarged fragmentary cross-sectional view of a viscous fluid, shear-type clutch embodying the invention.

Referring now to FIG. 2, the fluid clutch 12 includes a housing 23 which includes a rear wall member 24 having a hub 26 which is rotatably mounted by a suitable bearing 28 on the drive shaft 13. The housing 23 further includes a cover member or front wall 30 which has an annular flat surface 32 formed adjacent its peripheral edge, the latter being confined by an annular lip 33 in an annular recess 34 formed in the housing 23. Cooling fins 35 and 36 are formed on the outer surfaces of the rear wall member 24 and the cover member 30, respectively. A second annular recess 38 is formed radially inward of the outer periphery of the annular recess 34. A divider wall 40 is confined adjacent its outer edge in the second annular recess 38 by the cover member 30. A seal 42 is compressed in an annular groove 43 formed in the rear wall member 24 intermediate the outer edges of the annular recesses 34 and 38. A third annular deeper recess 44 is formed in the rear wall member 24 radially inward of the second annular recess 38. A clutch plate 46 is secured at its center by any suitable means to the drive shaft 13, the outer peripheral portion thereof being freely located in an operating or working chamber 48 formed by the third annular recess 44.

Adjacent portions of the clutch plate 46 and the rear wall member 24 are provided with torque-transmitting elements consisting of cooperating annular ridge and groove elements 50 and 52, respectively, with an intervening fluid shear space 54 therebetween to accommodate a viscous fluid as a torque-transmitting medium.

Referring now to FIG. 3, it may be noted that the clutch plate 46 further includes a plurality of equispaced openings 55 formed therein at a point radially inward from the ridge and grove elements 50 and 52. A pair of oppositely disposed smaller openings 56 are formed in the clutch plate 46 adjacent the outermost edge thereof, one of which is illustrated as being radially aligned with one of the larger openings 55, but such need not be the case. A pair of radial grooves, such as V-shaped grooves 57 (FIGS. 3 and 4), are formed in the clutch plate 46 across the ridges 50 and terminating at the openings 56. The grooves 57 assist in the process of removing the fluid medium for the working chamber 48.

It may be noted in FIG. 2 that the front wall or cover member 30 includes an annular bend intermediate the centers and peripheral edges thereof which forms an annular reservoir 58 with the divider wall 40. One or more pump outlet openings 60 are formed through the divider wall 40 circumferentially adjacent pump or dam elements 62 formed on the divider wall 40, and at substantially the same radial distance from the center of the clutch 12 as the outer clutch plate openings 56. The pump outlet openings 60 communicate between the operating chamber 48 and the annular reservoir 58 and are substantially the same diameter as the clutch plate openings 56. The pump or dam elements 62 may consist of a circular boss formed on the divider wall 40 by any suitable means, such as stamping, or it may be a rectangular-shaped or other-shaped member secured to the divider wall 40, such as by welding. It is to be understood that, in some applications, one outlet and one pump element may be sufficient, while other applications may require two such pumping arrangements. In the latter instance, one of the outlet openings 60 may at times be closed by an internal bimetallic thermostatic valve (not shown).

It may be noted in FIGS. 2 and 5 that a wear-cushion member 64 is located between the opposing thrust faces 65 and 66 of the clutch plate 46 and the rear wall member 24, respectively, radially outwardly of the ridge and groove elements 50 and 52. The wear-cushion member 64 may be secured in any suitable manner for rotation with the clutch plate 46, or, as illustrated in FIGS. 5 and 6, the cushion 64 may include one or more protrusions 67 formed on its outer periphery for insertion in cooperating longitudinal slots 68 formed in the wall of the recess 44 in the rear wall member 24.

As further illustrated in FIG. 7, the opposing faces 65 and 66 of the clutch plate 46 and the rear wall member 24, respectively, may be parallel tapered so that, under any wobble conditions, the clutch face 65 will first contact one side of the wear-cushion 64 at the radially outermost portion thereof, while the rear wall face 66 will first contact the outer side of the wear-cushion 64 at the radially innermost portion thereof for a purpose to be described.

One or more inlet ports 70 are also formed in the divider wall 40, communicating between the annular reservoir 58 and the working chamber 48 radially inward of the pump elements 62 and the pump outlet openings 60. The inlet port 70 is at times closed off by a valve member 72, which may be responsive to temperature changes or to centrifugal force. The valve member 72 is illustrated as being secured in any suitable manner to a reduced diameter portion 76 of a center pin or shaft 78, which is rotatably mounted in a central opening 80 formed in the front wall or cover member 30. A seal ring 82 may be mounted in an annular groove 84 formed in the pin 78 within the central opening 80 to prevent leakage therepast. A helically wound, bimetallic thermostatic valve control element 86 is provided with an inwardly extending end portion 88 which is mounted in a transverse slot 90 formed in the pin 78. An outwardly extending end portion 92 of the bimetallic element 86 is secured to a post 94. With this arrangement, a change in ambient temperature either winds or unwinds the bimetallic element 86, resulting in rotation of the pin 78 and the valve member 72.

OPERATION

So long as the vehicle engine 10 (FIG. 1) is in operation, the drive shaft 13 and the associated clutch plate 46 (FIG. 2) will be driven by the pulley 11 operatively connected via the belt 15 to the crankshaft (not shown) at an appropriate speed ratio with respect to engine speed. The initial position of the temperature-responsive valve member 72 will be closed across the inlet port or opening 70 in the divider wall 40, and will remain closed so long as the engine is cold, thus preventing any flow of fluid from the annular reservoir 58 into the working chamber 48. Since at least one pump outlet opening 60 is always open, providing continuous communication between the working chamber 48 and the annular reservoir 58, fluid from the working chamber 48 will be pumped therethrough by virtue of the pump elements 62 serving as dams or wipers, forcing the fluid to flow into the respective pump outlet openings 60 and, thence, into the annular reservoir 58. A continual supply of fluid is made available to the wiper elements 62 by virtue of the openings 56 formed in the clutch plate 46. The openings 56 are fed by fluid from the radial grooves 57 under the action of centrifugal force and the effect of suction created by the pumping action of the wiper elements 62 and the outlets 60.

The total volume of fluid is such that when working chamber 48 is substantially empty, i.e., at a level designated by broken line "E," FIG. 2, at the outermost edge of the openings 56, the fluid in the annular reservoir 58 will be held under the action of centrifugal force in the outer annular portion of the reservoir 58 with an inner from liquid level "A," FIG. 2, the head resulting from the fluid height "A" to "E" being offset by the force generated by the pumping action of the pump elements 62 on the fluid remaining in the working chamber 48, to prevent any flow-back through the pump outlet openings 60. Under this condition, commonly known as the "disengaged mode," the slip between the clutch plate 46 and the housing 23 is greatest, and fan 16 speed is correspondingly low, as represented by the curve "A'" in FIG. 9.

As the ambient temperature increases due to the warmup of the radiator and engine, the bimetallic thermostatic valve control element 86 will begin to wind up and, since it is restrained at its outer end portion 92 by the post 94, its inner end portion 88 will rotate the cooperatively connected pin 78 and the valve member 72, progressively uncovering the inlet ports 70 in the divider wall 40, as will be described. As a result, fluid will flow through the inlet ports 70 back into the working chamber 48, generally progressively increasing the volume therein with increasing temperature. More specifically, as the fluid is admitted through the inlet ports 70 by the temperature-controlled valve element 72, it will first be projected radially outwardly between the divider wall 40 and the adjacent face of the clutch plate 46. It is believed to begin to fill the peripheral shear space between the outer edge of the clutch plate 46 and the wall of the annular recess 44, while filling radially inwardly between the divider wall 40 and the adjacent face of the clutch plate 46. Once the fluid attains a level radially within the outer edge of the openings 55 formed in the clutch plate 46, it will spill through the openings 55 into the shear space 54.

It is felt that the spaces between the sides of the wear-cushion member 64 and the respective adjacent faces 65 and 66 of the clutch plate 46 and the rear wall member 24 may be filled with the fluid flowing either inwardly from the peripheral shear space between the outer edge of the clutch plate 46 and the wall of the annular recess 44, or outwardly from the ridge and groove fluid shear space 54, or some combination thereof.

Throughout the above, the volume of flow through the continually open pump outlet ports 60 remain s substantially constant, being influenced by the rotary speed of the clutch plate 46, and the working chamber 48 is filled in the manner just described until the inner annular levels in both the working chamber 48 and the annular reservoir 58 are at the level designated by "C" (FIG. 2), after which the fan 16 speed will remain at its highest constant speed, as represented by the corresponding curve "C'" of FIG. 9.

It is apparent that, as the viscous fluid is admitted to the working chamber 48 with increased temperature, filling the fluid shear space 54 between the oppositely disposed spaced ridge and groove elements 50 and 52, the shear-type fluid drive there between will be influenced, and "slip-speed," or the difference between the speed of the clutch plate 46 and that of the housing 23, will decrease, with the fan 16 speed progressively increasing, as indicated by curve "B'" in FIG. 9. So long as the inlet ports 70 in the divider wall 40 remain open, a fluid circulation process will prevail, i.e., the rotating pump or dam elements 62 will continue to promote the flow of fluid form the working chamber 48 through the pump outlet openings 60 to the annular reservoir 58 from whence it will continually return to the working chamber 48 via the variably opening inlet ports 70.

As indicated, when the cooling requirements are at a maximum, the temperature-responsive valve member 72 will have rotated completely past the inlet openings 70, permitting the fluid in the chamber 48 and the annular reservoir 58 to reach a point of equilibrium, i.e., liquid level "C" in FIG. 2, causing the relatively rotatable drive members 46 and 24 to operate at minimum slip-speed and thereby effecting a maximum cooling function, inasmuch as the fan 16 is secured to the outer portion of the rear wall member 24 of the housing 23 (FIG. 1). So long as the inlet ports 70 remain fully open, the circulation process described above will maintain the level "C" illustrated in FIG. 2.

Throughout the above-described cycle there are times when the reactions of the various moving components will result in "wobble" of the clutch plate 46 relative to the rear wall member 24. Heretofore, in order to forestall the ridges 50 from contacting the grooves 52, and resulting in wear therebetween which adversely affects the shear drive characteristic, care has been exercised to assure that the thrust face 65 of the clutch plate 46 will contact the thrust face 66 of the rear wall 24 before any ridge 50 can contact its adjacent groove 52. This, however, has resulted in excessive wear occurring on either the clutch plate face 65 or the rear wall face 66 and the eventual contact between the juxtapositioned ridge 50 and the groove 52 elements.

It is a feature of the invention to provide a wear-cushion member 64 formed of a high-quality wear-resistant steel composition or other suitable material intermediate the faces 65 and 66, the latter faces being spaced apart at assembly as required to accommodate the insertion of the wear-cushion member 64, the latter member serving as a cushion or buffer and also as a bearing member therebetween which greatly minimizes the wear on either of the relatively rotating drive members.

If desired, as indicated above, the wear-cushion or bearing member 64 may be secured in any suitable manner to any convenient portion of the clutch plate 46. Also, if desired, the member 64 may be mounted for rotation with the rear wall 24 via interconnected protrusion and slot elements 67 and 68, respectively, (FIG. 6). formed on the outer periphery of the wear-cushion 64 and the cylindrical wall of the recess 44. As may be noted in FIG. 6, the protrusions 67 are freely fitted in the slots 68 in order that the wear-cushion member 64 may move axially relative to the housing 23 and the clutch plate 46. The overall space provided between the clutch plate 46 and the wall 24 is such that, after the insertion of the wear-cushion member 64 in place in the housing 23, the space remaining between the wear-cushion 64 and the clutch plate 46 will serve as an additional shear-drive space, supplementing the shear-drive provided by the shear space 54 between the ridge and groove elements 50 and 52. Allowance in the overall space between the faces 65 and 66 of the clutch plate 46 and the rear wall 24, respectively, is also made for a film of fluid between the face 66 of the rear wall 24 and the adjacent face of the wear-cushion member 64. Such a film of fluid serves to cushion any impact shock that might occur between the relatively rotating members, under wobble conditions or other pivotal or axial movements therebetween.

A supply of fluid is assured by virtue of the slots 68 serving as a passage for the fluid which is pumped therethrough by the relative rotation between the outer edge of the clutch plate 46 and the adjacent wall of the housing 24. Such pumping action continually forces the fluid radially inwardly between the wall 24 and the wear-cushion member 64 and over the inner peripheral edge of the latter. If necessary, the latter may include circumferential openings or notches formed at spaced intervals around the inner periphery thereof, to aid the fluid which is being forced inwardly, as described, to spill past the radially outermost ridge member 50 into the space between the clutch plate 46 and the cushion member 64. In view of the flowpath just described, fluid will not remain confined between the cushion member 64 and the rear wall 24 and thus serves as a pressure means forcing the cushion member 64 away from the wall 24 to contact the clutch plate 46 or to approach so close thereto that the desired shear-drive relationship is varied. If desired, pockets may be formed in the wall 24 adjacent the outer edge of the wear-cushion 64 for receiving the fluid.

It has been determined that with the longitudinal slots 68 formed in the wall of the recess 44 in the rear wall member 24 and located in a predetermined radial relationship with the outlet openings 60 and the pump or dam elements 62, whether or not the opposing faces 65 and 66 of the clutch plate 46 and the rear wall 24, respectively, are spaced far enough apart to accommodate the inclusion of the wear-cushion member 64, during a "cold start" operation, the time required of the fluid to be pumped out of the working chamber 48, in order to eliminate fan noise, is substantially shortened, as compared to the time required when the longitudinal slots 68 are not employed.

Another embodiment is illustrated in FIG. 7, wherein the respective clutch plate and wall member faces 65 and 66 are formed to slope parallel to one another. In this arrangement, the intermediate wear-cushion member 64 is forced to flex under pivotal or axial movable conditions, in the manner illustrated in the exaggerated wobble condition view of FIG. 8. Such flexing serves to further cushion the impact between the clutch plate 46 and the flexible member 64 and between the latter and the rear wall 24, thereby reducing the resultant intermittent increased loads on the water pump 14 (FIG. 1) through the drive shaft 13, while reducing wear on the contacting members. The parallel relationship between opposing faces 65 and 66 may be in the reverse direction, so that the flexing of the wear-cushion is the reverse of that illustrated in FIG. 8.

It should be apparent that the invention provides improved means for minimizing wear and cushioning the impact shock between the various relatively rotatable components of the clutch 12 heretofore encountered under wobble conditions, thereby increasing the operational life of the clutch 12 and of the associated water pump 14.

It should be further apparent that one embodiment of the invention provides improved means for cushioning any impact between relatively rotatable and axially or pivotally movable drive members, thereby reducing the load on the associated water pump.

While several embodiments of the invention have been shown and described, other modifications thereof are possible.

I claim:

1. A viscous fluid clutch comprising first and second relatively rotatable drive means, said first drive means having an annular operating chamber and a reservoir chamber, fluid shear drive means formed on oppositely disposed annular portions of said first and second drive means located in said operating chamber forming a shear space therebetween and operable with a fluid to provide a shear-type fluid drive between said first and second drive means, said operating chamber having outlet opening means at an outer portion and inlet opening means at an inner portion, pump means on one of said drive means to pump fluid from said operating chamber through said outlet opening means to said reservoir chamber, and an annular wear-cushion member mounted radially outwardly of said fluid shear drive means intermediate second oppositely disposed annular portions of said first and second drive means and operatively connected to one of said first and second drive means so as to be rotatable therewith and axially movable relative thereto for minimizing wear on the other of said first and second drive means and cushioning the impact therebetween during relative operational wobble of said first and second drive means.

2. A viscous fluid clutch comprising first and second relatively rotatable drive means, said first drive means having an annular operating chamber and a reservoir chamber, said second drive means being rotatably mounted in said operating chamber, a plurality of annular ridges formed on one of said first and second drive means and a plurality of cooperating annular grooves formed on the other of said first and second drive means in said operating chamber, said annular ridges and grooves forming a shear space therebetween the operable with a fluid to provide a shear-type fluid drive between said first and second drive means, said operating chamber having an outlet opening means at an outer portion and inlet opening means at an inner portion, pump means on one of said drive means to pump fluid from said operating chamber through said outlet opening means to said reservoir chamber, and a plurality of longitudinal slots formed at spaced intervals in the surface of said first drive means around the outer periphery of said annular operating chamber and coordinated with the locations of said outlet opening means and said pump means for aiding said pump means to quickly pump said fluid from said operating chamber through said outlet opening means during a cold start operation.

3. The clutch described in claim 1, wherein said wear-cushion member is connected for rotation with said first drive means.

4. The clutch described in claim 1, wherein said wear-cushion member is connected for rotation with said second drive means.

5. A viscous fluid clutch comprising first and second relatively rotatable drive members; and first drive member including a first wall, a second wall, a divider wall sealed between said first and second walls, providing a working chamber between said divider and second walls and a second chamber between said first and divider walls, and a plurality of longitudinal slots formed therein adjacent said working chamber; fluid shear drive means formed on each of said first and second drive members, at first oppositely disposed annular portions thereof in said working chamber forming a shear space therebetween and a plurality operable with a fluid medium to provide a shear-type fluid drive therebetween; first opening means in said divider wall for providing communication from said working chamber to said second chamber; pump means on one of said drive members for causing said fluid medium to flow form said working chamber through said first opening means to said second chamber; second opening means formed in said divider wall for communicating said fluid medium from said second chamber to said working chamber; a wear-cushion member mounted radially outwardly of said fluid shear drive means intermediate second oppositely disposed annular portions of said first and second drive means for minimizing wear on said first and second drive means and preventing contact between said fluid shear drive means during relative operational wobble of said first and second drive means; plurality of protrusions formed on said wear-cushion member for being slidably mounted in said longitudinal slots to cause said wear-cushion member to rotate with said first drive member and to permit said wear-cushion member to slide axially relative to said first drive member and thereby permit said fluid medium to provide a fluid shear drive relationship between said wear-cushion member and said second drive member and to provide a cushioning means between said wear-cushion member and said first drive member.

6. A viscous fluid clutch comprising relatively rotatable housing and clutch plate members, said housing member including front and rear walls and defining a fluid cavity therebetween, a divider wall sealed between said front and rear walls in said fluid cavity and dividing said fluid cavity to first and second chambers, said clutch plate member being rotatable in said first chamber, said clutch plate member and said rear wall having opposed spaced annular parallel ridge and groove surfaces formed thereon defining a fluid shear space therebetween and cooperable with a fluid medium in said shear space to provide a shear-type fluid drive therebetween, a first opening formed in said divider wall for providing communication in said first chamber adjacent said first opening for causing said fluid medium to flow through said first opening for varying the volume of said fluid medium in said shear space to vary the torque transmitted between said housing and clutch plate members, a second opening formed in said divider wall for at times communicating said fluid medium for said second chamber to said first chamber, valve means for controlling the flow of said fluid medium through said second opening to further vary the torque transmitted between said housing and clutch plate members, an annular wear-cushion member secured for rotation with an axial movement relative to said housing member and adjacent opposing faces of said clutch plate and housing members, said faces being located radially outwardly of said opposed spaced annular parallel ridge and groove surfaces.

7. The viscous fluid clutch described in claim 6, and bimetallic thermostat means for actuating said valve means.

8. The viscous fluid clutch described in claim 6, wherein said faces are parallel to one another and extend radially outwardly from the axis of said viscous fluid clutch.

9. The viscous fluid clutch described in claim 6, wherein said face on said clutch plate includes a first portion closely adjacent an outer annular portion of said wear-cushion member and an inwardly extending portion tapering away from said wear-cushion member, and said face on said housing includes a first portion closely adjacent an inner annular portion of said wear-cushion member of the side opposite said outer annular portion and an outwardly extending portion tapering away from said wear-cushion member, said wear-cushion member being caused to flex intermediate and housing and clutch plate members during relative pivotal movement of one of said housing and clutch plate members, thereby cushioning the impact therebetween.

10. The viscous fluid clutch described in claim 6, wherein said face on said clutch plate a first portion closely adjacent a first annular portion of said wear-cushion member and a second portion tapering away from said wear-cushion member and a second portion tapering away from said wear-cushion member, ans said face on said housing includes a first portion closely adjacent a second annular portion of said wear-cushion member on the side opposite said first annular portion and a second portion tapering away from said wear-cushion member, said wear-cushion member being caused to flex intermediate said housing and clutch plate members during relative pivotal movement of one of said housing and clutch plate members, thereby cushioning the impact therebetween.

* * * * *